US012808488B2

(12) United States Patent
Ayaskanta et al.

(10) Patent No.: US 12,808,488 B2
(45) **Date of Patent: *Nov. 24, 2026**

(54) SYSTEM AND METHOD FOR HIGH FLOW RATE LIQUID HYDROGEN TANK FILLING

(71) Applicants: Arya Ayaskanta, Tonawanda, NY (US); Kedar Nawathe, Tonawanda, NY (US); Uzoma Mmeje, Tonawanda, NY (US); Sean M. Kelly, Tonawanda, NY (US); Anton Wellenhofer, Pullach (DE); Petya Toneva, Pullach (DE)

(72) Inventors: Arya Ayaskanta, Tonawanda, NY (US); Kedar Nawathe, Tonawanda, NY (US); Uzoma Mmeje, Tonawanda, NY (US); Sean M. Kelly, Tonawanda, NY (US); Anton Wellenhofer, Pullach (DE); Petya Toneva, Pullach (DE)

(73) Assignees: Praxair Technology, Inc., Danbury, CT (US); Linde GmbH, Pullach (DE)

(*) Notice: Subject to any disclaimer, the term of this patent is extended or adjusted under 35 U.S.C. 154(b) by 8 days.

This patent is subject to a terminal disclaimer.

(21) Appl. No.: 19/247,830

(22) Filed: Jun. 24, 2025

(65) Prior Publication Data

US 2026/0043520 A1 Feb. 12, 2026

Related U.S. Application Data

(63) Continuation-in-part of application No. 18/800,398, filed on Aug. 12, 2024, now Pat. No. 12,492,784.

(51) Int. Cl.
*F17C 5/04* (2006.01)

(52) U.S. Cl.
CPC ........ *F17C 5/04* (2013.01); *F17C 2205/0323* (2013.01); *F17C 2221/012* (2013.01); *F17C 2223/0161* (2013.01); *F17C 2223/033* (2013.01); *F17C 2225/0161* (2013.01); *F17C 2225/033* (2013.01); *F17C 2227/0164* (2013.01); *F17C 2227/0306* (2013.01); *F17C 2265/065* (2013.01); *F17C 2270/0171* (2013.01)

(58) Field of Classification Search
CPC .... F17C 5/04; F17C 13/002; F17C 2221/012; F17C 2227/0135
See application file for complete search history.

(56) References Cited

U.S. PATENT DOCUMENTS

| | | | | |
|---|---|---|---|---|
| 5,687,776 | A * | 11/1997 | Forgash | F17C 9/00 141/2 |
| 11,073,245 | B2 | 7/2021 | Bernhardt et al. | |
| 11,698,169 | B2 * | 7/2023 | Hodgson | F17C 13/002 62/48.1 |

(Continued)

FOREIGN PATENT DOCUMENTS

| | | | |
|---|---|---|---|
| DE | 102007057979 | A1 | 6/2009 |
| DE | 102015003340 | B4 | 2/2017 |
| WO | 0165168 | A1 | 9/2001 |

*Primary Examiner* — Timothy L Maust
(74) *Attorney, Agent, or Firm* — Robert J. Hampsch

(57) ABSTRACT

A system and method for high rate liquid hydrogen tank filling with minimal vapor losses is provided. The flexible, pump-based filling system can achieve high fill rate of liquid hydrogen in excess of 100 kg per minute and accommodate maximum delivery pressures. The present system and method further includes recovery and re-liquefaction of displaced and flash generated tank vapors.

25 Claims, 4 Drawing Sheets

(56) References Cited

U.S. PATENT DOCUMENTS

| | | | | |
|---|---|---|---|---|
| 12,492,784 | B2 * | 12/2025 | Kelly | F17C 5/02 |
| 2020/0370709 | A1 | 11/2020 | Guedacha et al. | |
| 2021/0341101 | A1 | 11/2021 | Allidieres et al. | |
| 2023/0160529 | A1 | 5/2023 | Light et al. | |
| 2023/0160533 | A1 | 5/2023 | Demolliens et al. | |

* cited by examiner

SYSTEM AND METHOD FOR HIGH FLOW RATE LIQUID HYDROGEN TANK FILLING

CROSS REFERENCE TO RELATED APPLICATIONS

This application is a continuation in part application that claims the benefit of and priority U.S. patent application Ser. No. 18/800398 filed on Aug. 12, 2024 the disclosure of which is incorporated by reference.

TECHNICAL FIELD

The present invention relates to filling transport tanks with liquid hydrogen, and more particularly, to a system and method for the high flow rate, low pressure transfer of liquid hydrogen from a supply tank to transport tank, such as a liquid hydrogen tanker or trailer for commercial transport of merchant liquid hydrogen.

BACKGROUND

Many conventional liquid hydrogen filling operations in the United States transfer liquid hydrogen from a hydrogen source tank or holding tank such as a hydrogen sphere to a target tank such as a trailer tank or tender rail car via differential pressure (i.e. gravity filling) where the holding tank is at a higher pressure than the target tank. Flash vapor losses from the drop in pressure during the transfer from the holding tank to the target tank are either vented to the atmosphere or recycled back to a hydrogen liquefier via a dedicated compressor or eductor. If the trailer tanks arrive at the filling location with a higher pressure than the source tank, or if trailer tanks arrive at the filling location in a generally warm condition, the trailer tank is typically conditioned by reducing the pressure of the trailer tank (i.e. blow-down) and/or cooling the warm trailer tank with liquid hydrogen. Significant vapor may be generated during the pressure reducing blow-down of the trailer tank, or the boil-off of liquid hydrogen that is used to cool down a warm trailer tank. These vapor losses are very often recovered if the vapor is recycled, but this trailer conditioning (e.g. blow down and cooling) takes time. Under typical conditions, the differential pressure filling process transfers liquid hydrogen at flow rates in the range of about 10-30 kg/min. At this transfer flow rate, a 3500 kg trailer tank fill will nominally take about 3 hours after target tank conditioning. Additional time is typically required to adequately condition the target tank.

Decarbonation initiatives are driving the transition toward hydrogen powertrains for heavy duty vehicles such as heavy duty trucks, freight rail, and aircraft. For the required payloads and distances in the use cases for these heavy duty vehicles, liquid hydrogen as a fuel source has significant advantages over compressed gaseous hydrogen. For heavy duty trucks, tanks of roughly 80 kg to 120 kg capacity are to be filled with subcooled liquid hydrogen at elevated pressures through specialized equipment. These liquid hydrogen fill applications have fill rates of about 100 kg/hour. For freight rail applications in the United States, tender rail cars comprising liquid hydrogen tanks and vaporizers are currently under development to supply hydrogen fuel to freight locomotives and hydrogen-based dual fuel locomotives. These liquid hydrogen tender rail cars under development for freight rail applications typically are designed with about 8000 kg of liquid hydrogen capacity.

What is needed therefore is a high flow rate liquid hydrogen filling system for filling of hydrogen tanker trailers, tender rail cars, as well as filling of other liquid hydrogen tanks used in other heavy duty applications that reduces filling time and minimizes vapor losses. More specifically, what is needed is a high rate liquid hydrogen filling system configured to fill tanks with liquid hydrogen, at transfer flow rates in excess of about 6000 kg/hour or greater than about 100 kg/min which would serve as an enabler for economical large-scale shipment of liquid hydrogen. Such high rate liquid hydrogen filling system and process should also minimize vapor losses or flash losses of the hydrogen to a level of 5% or less while eliminating the extra time required for conditioning of the tanker trailers or tender rail cars and minimizing the overall capital costs of the liquid hydrogen filling system. A liquid hydrogen filling system and method capable of filling tanks at such high fill rates in a safe manner would eliminate a key hurdle to the adoption of hydrogen technology for heavy duty applications and facilitate development of safe standards for hydrogen refueling systems and practices.

In addition, to minimize the capital and operational costs associated with liquid hydrogen filling operations, it would be advantageous to eliminate the need for installing and operating a hydrogen liquefier to recover and recycle the hydrogen vapor created during the high flow rate fill process.

SUMMARY

The presently disclosed system and method for filling hydrogen tanks is a minimal loss, fast fill approach that uses two or more cryogenic pumps and a recovery heat exchanger disposed between the hydrogen holding tank (i.e. source tank) and the liquid hydrogen target tank or container. The cryogenic pumps deliver pressurized liquid hydrogen that is used in the heat exchanger to liquefy the saturated vapor hydrogen stream from a headspace or overhead of the target tank. The reliquefied stream is recycled to a recovery tank where it is stored and subsequently used to fill the next target tank. The two or more cryogenic pump arrangement allows liquid hydrogen filling at high target tank pressures, which reduces vapor losses due to depressurization and also reduces overall fill time.

More specifically, the present invention may be characterized as a liquid hydrogen filling system, comprising: (a) a holding tank configured to store liquid hydrogen; (b) two or more cryogenic pumps disposed in series arrangement downstream of the holding tank and configured to pressurize a stream of liquid hydrogen from the holding tank to form a pressurized liquid hydrogen stream; (c) a recovery heat exchanger configured to warm the stream of liquid hydrogen via indirect heat exchange against a recycled gaseous hydrogen stream to yield a liquid hydrogen recycle stream; (d) a target tank configured to receive the warmed, pressurized liquid hydrogen stream; (e) a recycle circuit comprising a first conduit configured to direct a saturated vapor hydrogen stream from a headspace or overhead of the target tank to the heat exchanger as the recycled gaseous hydrogen stream and a second conduit configured to receive the liquid hydrogen recycle stream; (f) one or more valves disposed in the recycle circuit downstream of the heat exchanger; and (g) a recovery tank disposed downstream of the one or more valves and configured to receive the liquid cryogen recycle stream, and wherein a liquid hydrogen stream from recovery tank is recycled. In some embodiments the one or more valves further comprise an expansion valve configured to expand the liquid cryogen recycle stream to form a dual phase cryogen recycle stream and the dual phase cryogen recycle stream is directed to the recovery tank. In other embodiments, the one or more valves further comprise a pressure control valve configured to control the pressure in the recycle circuit and wherein the liquid cryogen recycle stream is directed to the recovery tank where it expands to a dual phase cryogen recycle stream.

The present invention may also be characterized as a method of filling a tank with liquid hydrogen comprising the steps of: (i) pressurizing liquid hydrogen from a holding tank to form a pressurized liquid hydrogen stream; (ii) warming the pressurized liquid hydrogen stream via indirect heat exchange against a recycled gaseous hydrogen stream to yield a liquid hydrogen recycle stream and a warmed, pressurized liquid hydrogen stream; (iii) filling a target tank with the warmed, pressurized liquid hydrogen stream; (iv) taking a saturated vapor hydrogen stream from a headspace or overhead of the target tank as the recycled gaseous hydrogen stream; (v) expanding the liquid cryogen recycle stream to form a dual phase cryogen recycle stream within a recovery tank or directed to the recovery tank; and (vi) recycling the hydrogen liquid from the recovery tank to either the holding tank or to the pressurized liquid hydrogen stream. In some embodiments, the step of expanding the liquid cryogen recycle stream further comprises expanding the liquid cryogen recycle stream in an expansion valve disposed upstream of the recovery tank to form a dual phase cryogen recycle stream and the dual phase cryogen recycle stream is directed to the recovery tank whereas in other embodiments, the recovery tank is a flash vessel and the liquid cryogen recycle stream is released directly into the recovery tank where it expands to form a dual phase cryogen recycle stream.

In various embodiments of the above-described liquid hydrogen filling system and associated method, the liquid hydrogen stream from the recovery tank is at an elevated or moderate pressure and is recycled and combined with the stream of liquid hydrogen from the holding tank at a location between the two or more cryogenic pumps. In other embodiments, the liquid hydrogen stream from the recovery tank is at an elevated or moderate pressure and is recycled and directly combined with the liquid hydrogen in the holding tank. In the various embodiments of the liquid hydrogen filling system, the hydrogen vapor from the recovery tank may be vented to the atmosphere or alternatively directed to the heat exchanger to cool the liquid hydrogen recycle stream. Lastly, the heat exchanger may be disposed downstream of the two or more cryogenic pumps or may be interposed between the two or more cryogenic pumps.

Also in many embodiments of the present system and method, the flow rates of the liquid hydrogen through the first cryogenic pump and through the second cryogenic pump exceed 100 kg/min of liquid hydrogen. In such embodiments, the pressure of the holding tank is preferably in the range of 1.2 bar(a) and 2.4 bar(a) and the pressure of the target tank is preferably in the range of 4.0 bar(a) and 10.0 bar(a). Likewise, the temperature of the liquid hydrogen in the holding tank is preferably equal to or lower than 23 Kelvin and the temperature of the liquid hydrogen in the target tank is preferably equal to or greater than 26 Kelvin.

BRIEF DESCRIPTION OF THE DRAWINGS

It is believed that the claimed invention will be better understood when taken in connection with the accompanying drawings in which:

DETAILED DESCRIPTION

Figure 1:
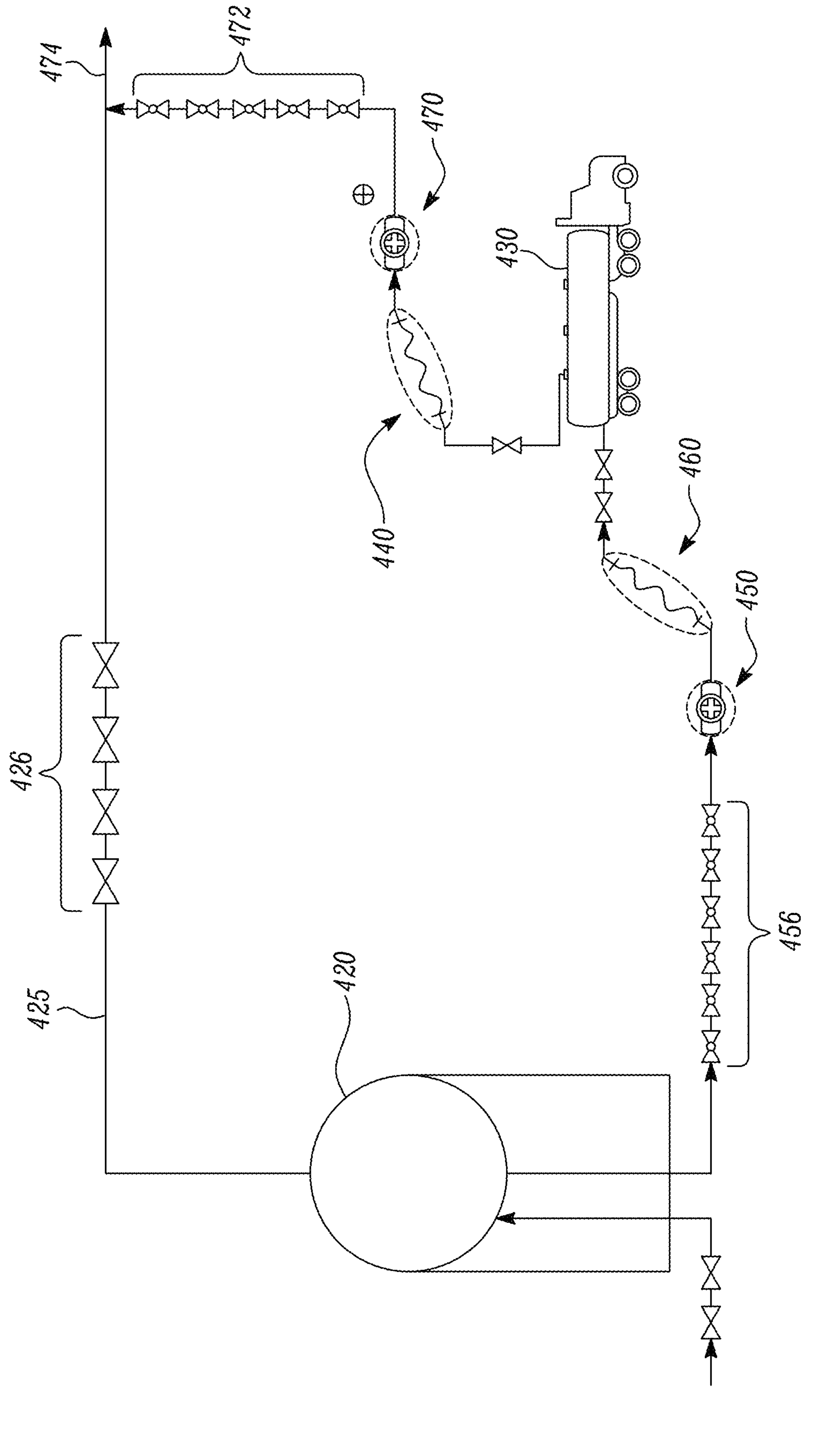
FIG. 1 shows a generalized schematic illustration of a conventional liquid hydrogen filling system and process from a holding tank to a target tank.

Turning to FIG. 1, there is shown a schematic illustration of a conventional liquid hydrogen filling system and process to transfer liquid hydrogen from a holding tank to a target tank using a differential pressure mode of operation. In the illustrated schematic, liquid hydrogen is added to the holding tank from a liquid hydrogen source (not shown) such as a nearby hydrogen liquefier (not shown). The illustrated holding tank 420 holds up to 1.3 million gallons of liquid hydrogen at a pressure of about 1.3 bar(a). Liquid hydrogen is withdrawn from the holding tank and transferred to a fill bay 450 while being reduced in pressure by a series of valves 456 disposed upstream of the fill bay 450. The liquid hydrogen is then transferred from the fill bay 452 via a corrugated hose 460 to the target tank 430. Where the target tank is a trailer tank, as illustrated, it typically holds about 16,000 gallons of liquid hydrogen at a pressure less than the pressure of the holding tank 420. Prior to such transfer of liquid hydrogen to the target tank 430, the target tank is typically conditioned by blow-down (i.e. reducing the pressure of the target tank and cooling of the target tank using a small stream of liquid hydrogen. The hydrogen vapor created during the conditioning step is typically vented to the atmosphere, flared or recycled to a recovery compressor.

During the conventional liquid hydrogen fill process depicted in FIG. 1, hydrogen vapor accumulating in the headspace or overhead of the target tank 430 is extracted from the target tank 430 and transferred via another corrugated hose 440 to a recovery bay 470. From the recovery bay 470, gaseous hydrogen is further reduced in pressure by another series of valves 472 and directed to a recycle circuit 474 which may include a recovery compressor (not shown). Hydrogen vapor accumulating in the headspace or overhead of the holding tank 420 is also extracted from the holding tank 420 and transferred via another recycle line 425 where it is reduced in pressure via valves 426 and added to the recovered gaseous hydrogen from recovery bay 470. The recovered gaseous hydrogen from both the target tank 430 and the holding tank 420 is then compressed in the recovery compressor and then re-liquefied in a hydrogen liquefier.

Figure 2:
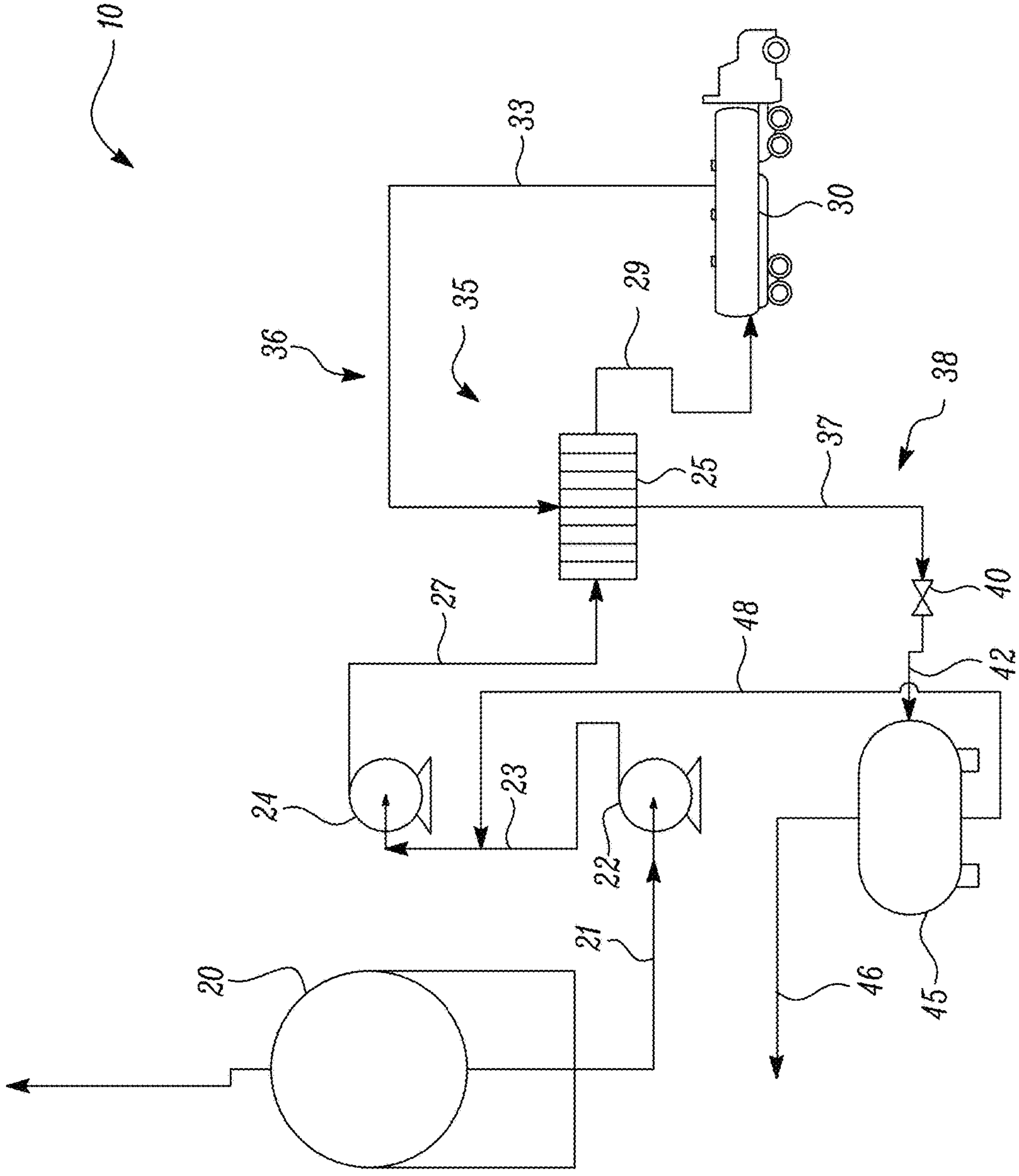
FIG. 2 shows a generalized schematic illustration of an embodiment of the present high flow rate hydrogen filling system and process.

Turning now to FIG. 2, the illustrated liquid hydrogen filling system 10 includes a holding tank 20, a first cryogenic pump 22, a recovery heat exchanger 25, a second cryogenic pump 24, a target tank 30, an on-site recycle circuit 35, and a recovery tank 45. The illustrated on-site recycle circuit 35 in this embodiment includes a first conduit 36 configured to direct a hydrogen stream 33, preferably a saturated vapor hydrogen stream from a headspace or overhead of the target tank 30 to the heat exchanger 25 where the gaseous hydrogen exits as a liquid hydrogen stream 37, preferably a subcooled or a saturated liquid and a second conduit 38 that directs the recycled liquid hydrogen stream 37 from the heat exchanger 25 towards the recovery tank 45. It is important to minimize the pressure drop, preferably less than about 0.5 bar(a), of the recycled vapor from the target tank through the heat exchanger so as to ensure condensation of the hydrogen vapor in the heat exchanger.

Associated with the recycle circuit 35 is valve 40, preferably an expansion valve or pressure control valve disposed within the second conduit 38 of recycle circuit 35. If using an expansion valve, the liquid hydrogen recycle stream 37 is expanded to form a dual phase hydrogen recycle stream 42 that is directed to recovery tank 45. The dual phase hydrogen recycle stream 42 is preferably at a pressure higher than the pressure of the liquid hydrogen in the holding tank 20, and more preferably at a pressure that matches the discharge pressure of the first cryogenic pump 22. Alternatively, in lieu of an expansion valve, a pressure control valve may be used instead that effectively controls the pressure of the target tank. In applications where the recycled liquid hydrogen is saturated, the recovery tank would act a flash vessel expanding the liquid hydrogen.

Overhead vapor 46 from the recovery tank is periodically vented to the atmosphere via a pressure control valve or pressure relief valve while a portion of the liquid hydrogen from the recovery tank 45 is recycled and combined with the stream of liquid hydrogen taken from the holding tank 20. In the illustrated embodiment, the liquid hydrogen stream 48 taken from the recovery tank 45 is recycled and combined with the stream of liquid hydrogen at a location between the first cryogenic pump 22 and the second cryogenic pump 24. Alternatively, the arrangement may be configured such that the recovery tank is the suction vessel of the second cryogenic pump and the pressures and flash control are managed or controlled via vent. The amount of recovered liquid from the recovery tank 45 that is mixed with the liquid hydrogen exiting the first cryogenic pump 22 is regulated to minimize vapor loss from recovery tank 45.

Likewise, the flow rate of liquid hydrogen stream 21 from the holding tank 20 is regulated to maintain the required or desired fill rates. Also disposed throughout this embodiment are appropriate valves, including relief valves, vent valves, and control valves (not shown) associated with the various equipment in the system, including pressure relief valves operatively coupled with the holding tank 20, target tank 30, and recovery tank 45.

For illustrative purposes only, during operation of the present hydrogen filling system the holding tank 20 is configured to store liquid hydrogen at a pressure that is less than or equal to 2.4 bar(a). The first cryogenic pump 22 is configured to receive a stream of liquid hydrogen from the holding tank 20 and pressurize the stream of liquid hydrogen to form an intermediate pressurized liquid hydrogen stream at a pressure greater than about 2.4 bar(a). The intermediate pressurized liquid hydrogen stream 23 is preferably subcooled and then further pressurized via a second cryogenic pump 24 to form a fully pressurized liquid hydrogen stream 27 at a pressure equal to or greater than about 4.0 bar(a), and more preferably to a pressure range of about 4.0 bar(a) and 10.0 bar(a). The fully pressurized liquid hydrogen stream 27 is then warmed in the heat exchanger 25 via indirect heat exchange against a recycled gaseous hydrogen stream or saturated vapor stream 33 from the target tank 30 while concurrently cooling the recycled gaseous hydrogen stream to form a liquid hydrogen recycle stream 37. The warmed liquid hydrogen stream 29 preferably exits the heat exchanger 25 at a temperature between about 26 Kelvin and 30 Kelvin which is below the saturation temperature and hence still in a liquid state and is then fed via a hydrogen product fill line to target tank 30. In this embodiment, target tank 30 is not required to be conditioned as the pressure of the warmed liquid hydrogen stream 29 is preferably above target tank pressure and cooling of 'warm' target tanks is not required due to the rapid on-site recycling of any vapor losses caused when filling 'warm' target tanks.

The flow rates of the liquid hydrogen through the first cryogenic pump 22 and through the second cryogenic pump 24 are preferably equal to or greater than 100 kg/min of liquid hydrogen which significantly reduces the fill time compared to conventional liquid hydrogen fill systems. Such cryogenic pumps are available or can be designed to achieve the desired high flow rates by Cryostar™. In addition, the pressure of the holding tank 20 is preferably in the range of 1.2 bar(a) and 2.4 bar(a) and the temperature of the liquid hydrogen in the holding tank is equal to or lower than 23 Kelvin whereas the temperature of the liquid hydrogen in the target tank 30 is equal to or greater than 26 Kelvin.

As indicated above, since the vapor loss from the recovery tank during operation is minimal, the vapor stream 46 from the recovery tank may be directly vented to the atmosphere. Alternatively, vapor from the recovery tank may be passed through an expansion valve, a turbine, or a similar device to reduce its pressure and temperature. The reduced pressure and temperature vapor stream can then be used to cool the saturated vapor hydrogen stream from a headspace or overhead of the target tank by passing it through a recovery heat exchanger. Similarly, any vapor generated in the sump of the first cryogenic pump and/or the second cryogenic pump can also be used to help cool the saturated vapor hydrogen stream from a headspace or overhead of target tank by passing it through a recovery heat exchanger. Alternatively, any vapor generated in first cryogenic pump and/or second cryogenic pump may also be used for cold keeping of heat exchanger as well as associated piping and flexible hoses.

During start-up of the hydrogen filling system, any 'warm' gas from the target tank that is introduced into the recycle circuit could unintentionally vaporize the liquid hydrogen. To mitigate this effect, the use of liquid nitrogen shielding is recommended. In addition, further mitigation techniques such as use of pressure control valves and associated vent lines is also recommended. More specifically, liquid nitrogen shielding of the heat exchanger and optionally the hydrogen vapor recovery line and the hydrogen product fill line is advantageous to facilitate start-up of the present liquid hydrogen filling system. Liquid nitrogen shielding refers to the use of liquid nitrogen to protect selected equipment from environmental conditions and is a form of temperature shielding, utilizing the cold of liquid nitrogen to create a desired environment (i.e. low dormant temperature) around selected equipment when not in operational use. To facilitate liquid nitrogen shielding of the heat exchanger, one embodiment of the present system may include an additional cooling passage through the heat exchanger configured to flow liquid nitrogen therethrough to keep the heat exchanger in cold conditions when the present liquid hydrogen filling system is not in operational use. Alternatively, the heat exchanger may be encompassed in a cold box type vessel or shell that uses liquid nitrogen to keep the heat exchanger in cold conditions when the present liquid hydrogen filling system is not in operational use.

Figure 3:
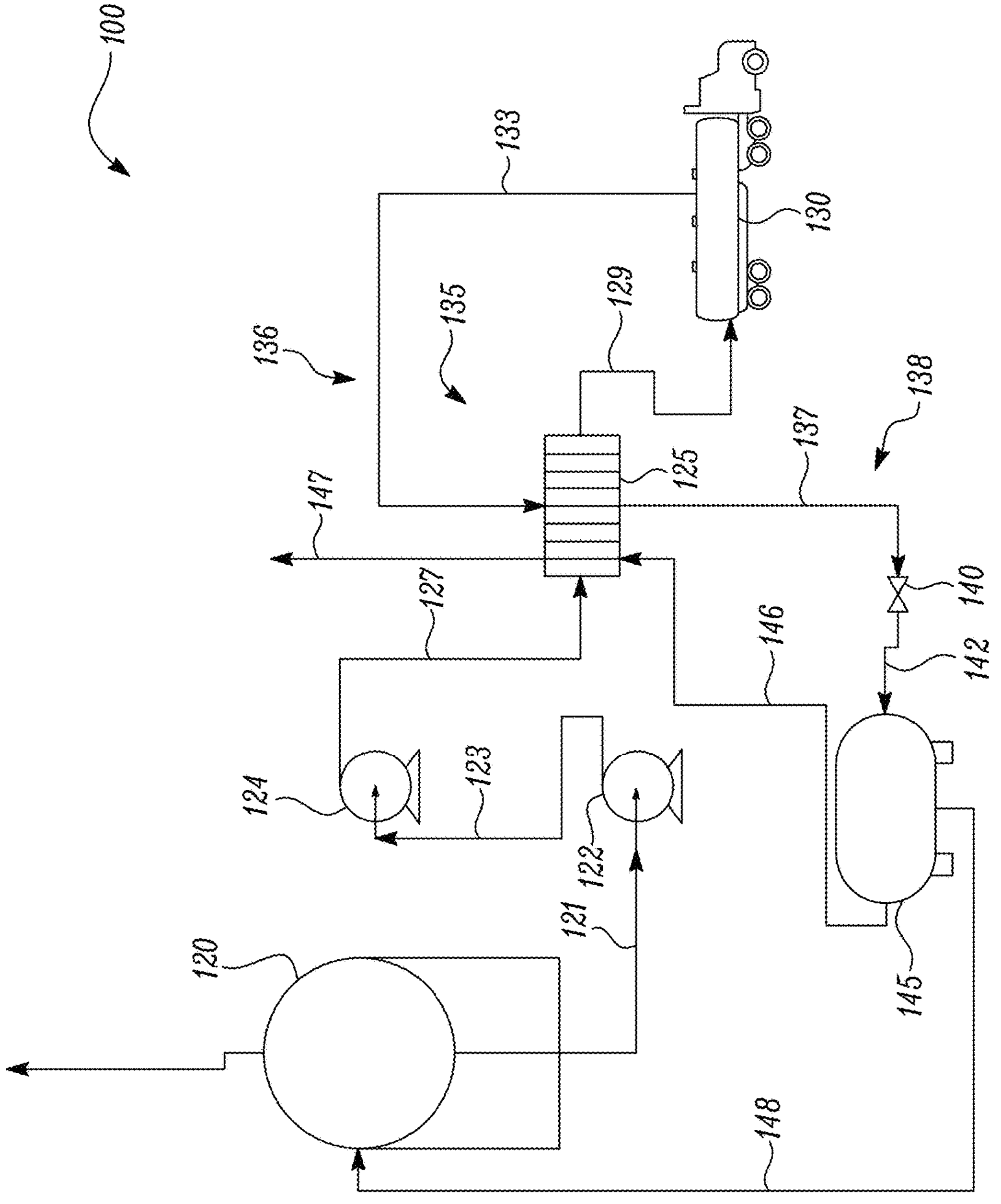
FIG. 3 shows another generalized schematic illustration of another embodiment of the present high flow rate hydrogen filling system and process.

Turning now to FIG. 3, an alternate embodiment of the liquid hydrogen filling system 110 is depicted. The embodiment of the liquid hydrogen filling system shown in FIG. 3 is particularly useful in situations or applications where a high-pressure recovery tank is not available or is not suitable for a particular location or application.

Similar to the embodiment depicted in FIG. 2, the embodiment shown in FIG. 3 also includes a holding tank 120, a first cryogenic pump 122, a heat exchanger 125, a second cryogenic pump 124, a target tank 130, an on-site recycle circuit 135, and a recovery tank 145. The on-site recycle circuit 135 in this embodiment also includes a first conduit 136 configured to direct a saturated vapor hydrogen stream from a headspace or overhead of the target tank 130 to the heat exchanger 125 where the gaseous hydrogen exits as a liquid hydrogen stream 137 and a second conduit 138 that directs the recycled liquid hydrogen stream 137 from the heat exchanger 125 towards the recovery tank 145. As indicated above, it is important to minimize the pressure drop, preferably less than about 0.5 bar(a), of the recycled vapor from the target tank through the heat exchanger so as to ensure condensation of the hydrogen vapor in the heat exchanger.

Associated with the recycle circuit 135 is valve 140, preferably an expansion valve or pressure control valve disposed within the second conduit 138 of recycle circuit 135. If using an expansion valve, the liquid hydrogen recycle stream 137 is expanded to form a dual phase hydrogen recycle stream 42 that is directed to recovery tank 145. The dual phase hydrogen recycle stream 142 is preferably at a pressure higher than the pressure of the liquid hydrogen in the holding tank 120, and more preferably at a pressure that matches the discharge pressure of the first cryogenic pump 122. Alternatively, in lieu of an expansion valve, a pressure control valve may be used instead that effectively controls the pressure of the target tank and the recovery tank would act a flash vessel expanding the liquid hydrogen.

A vapor stream 146 from recovery tank 145 is directed to heat exchanger 125 to assist in cooling the saturated vapor hydrogen stream from a headspace or overhead of the target tank 130 while a portion of the liquid hydrogen 148 from the recovery tank 145 is recycled and combined with the liquid hydrogen in the holding tank 120. The warmed vapor stream 147 is then vented to the atmosphere. The amount of recovered liquid from the recovery tank 145 that is directed to the holding tank 120 is regulated in an effort to minimize vapor loss from the recovery tank 145. Similar to the earlier described embodiments, the flow rate of liquid hydrogen stream 121 from the holding tank 130 is regulated to maintain the required or desired fill rates. Disposed throughout the illustrated embodiment are appropriate valves, including relief valves and control valves (not shown) associated with the various equipment in the system, including pressure relief valves operatively coupled with the holding tank 120, target tank 130, and recovery tank 145. In this embodiment, the recovery tank is preferably disposed above or at an elevation higher than the holding tank so that the liquid hydrogen will drain from the recovery tank to the holding tank.

The holding tank 120 may be configured to store liquid hydrogen at a pressure that is less than or equal to 2.4 bar(a). The first cryogenic pump 122 is configured to receive a stream of liquid hydrogen from the holding tank 20 and pressurize the stream of liquid hydrogen to form an intermediate pressurized liquid hydrogen stream 123 at a pressure greater than about 2.4 bar(a). The intermediate pressurized liquid hydrogen stream 123 is preferably subcooled and then further pressurized via a second cryogenic pump 124 to form a fully pressurized liquid hydrogen stream 127 at a pressure equal to or greater than about 4.0 bar(a), and more preferably to a pressure range of about 4.0 bar(a) and 10.0 bar(a). The fully pressurized liquid hydrogen stream 127 is then warmed in the heat exchanger 125 via indirect heat exchange against a recycled gaseous hydrogen stream or saturated vapor stream 133 from the target tank 30 while concurrently cooling the recycled gaseous hydrogen stream 133 to form a liquid hydrogen recycle stream 137. The warmed liquid hydrogen stream 129 preferably exits the heat exchanger 125 at a temperature between about 26 Kelvin and 30 Kelvin which is below the saturation temperature and hence still in a liquid state and is then fed to the target tank 130. In this embodiment, the target tank 130 is not required to be conditioned as the pressure of the warmed liquid hydrogen stream 129 is preferably above the target tank pressure and cooling of 'warm' target tanks is not required due to the rapid on-site recycling of any vapor losses caused when filling 'warm' target tanks.

As an alternative configuration, it is conceivable to eliminate the recovery tank altogether and instead use the holding tank as a separator vessel for the recycled hydrogen stream, with the hydrogen vapor from the overhead of the holding tank continuously being directed to the heat exchanger while the liquid portion of the remains with the liquid hydrogen in the holding tank.

Figure 4:
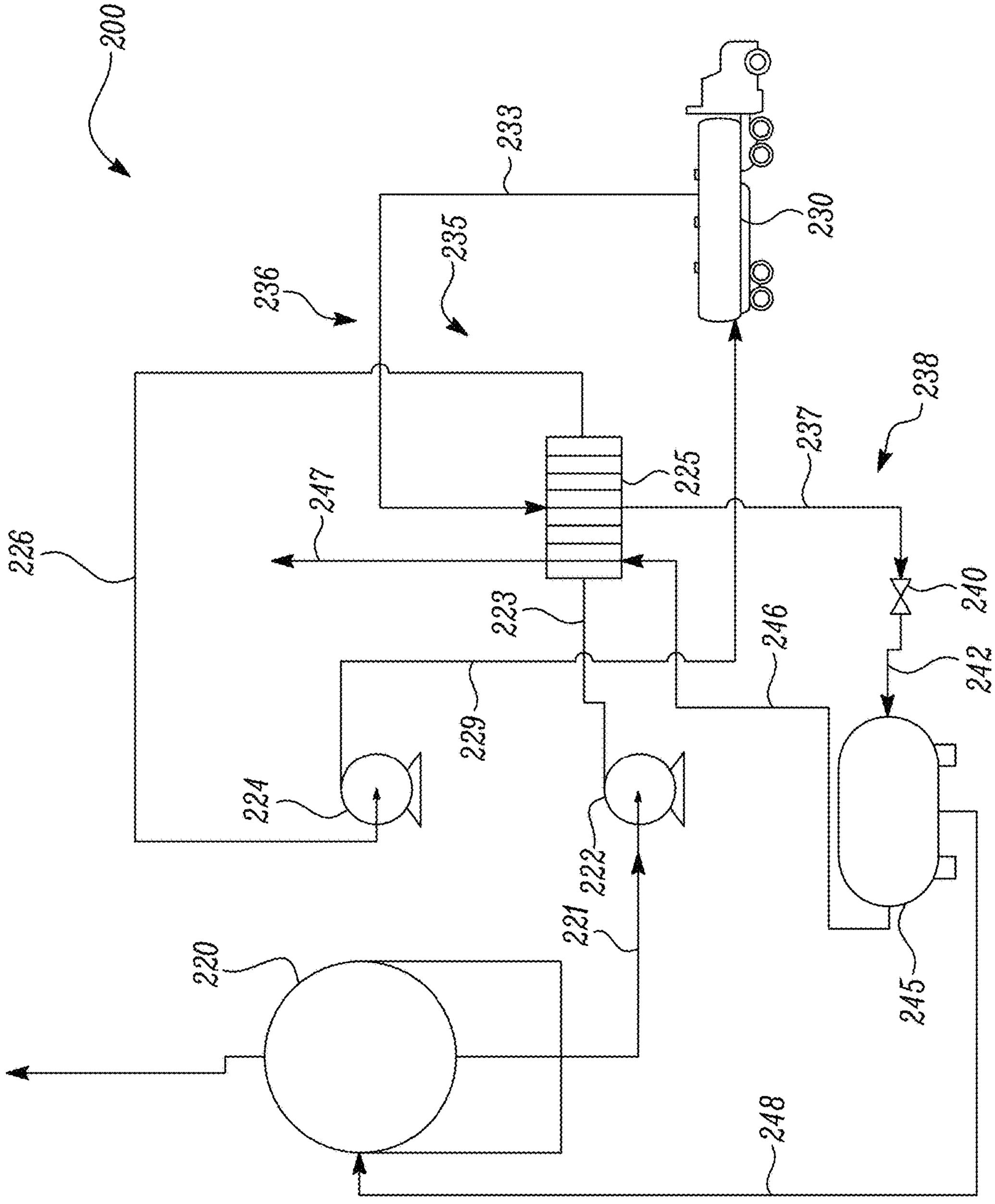
FIG. 4 shows a generalized schematic illustration of yet another embodiment of the present high flow rate filling system and process.

Turning now to FIG. 4, there is shown a schematic of yet another embodiment of the present system and method. Many of the features, components and streams associated with the system and method depicted in FIG. 4 are similar or identical to those described above with reference to the embodiments of FIGS. 2 and 3, and for sake of brevity will not be repeated in detail here. The key differences between the system and method shown in FIG. 4 compared to the embodiment described above with particular reference to FIG. 3, is the interposing of the heat exchanger between the first cryogenic pump and the second cryogenic pump such that the operating pressures of the heat exchanger are reduced when compared to the arrangements depicted in FIGS. 2 and 3. In addition, the cooling profiles in the heat exchanger would also be different, which could be useful in selected applications.

Similar to the embodiments depicted in FIGS. 2 and 3, the embodiment shown in FIG. 4 also includes a holding tank 220, a first cryogenic pump 222, a heat exchanger 225, a second cryogenic pump 224, a target tank 230, an on-site recycle circuit 235, and a recovery tank 245. The on-site recycle circuit 235 in this embodiment also includes a first conduit 236 configured to direct a saturated vapor hydrogen stream 233 from a headspace or overhead of the target tank 230 to the heat exchanger 225 where the gaseous hydrogen exits as a liquid hydrogen stream 237 and a second conduit 238 that directs the recycled liquid hydrogen stream 237 from the heat exchanger 225 towards the recovery tank 245. Associated with the recycle circuit 235 is an expansion valve 240 disposed within the second conduit 238 of recycle circuit 235 and configured to expand the liquid hydrogen recycle stream 237 to form a dual phase hydrogen recycle stream 242 that is directed to recovery tank 245. In this embodiment, the dual phase hydrogen recycle stream 242 is preferably at a pressure equal to the pressure of the liquid hydrogen in the holding tank 220.

In the embodiment shown in FIG. 4, the first cryogenic pump 222 is configured to receive a stream of liquid hydrogen from the holding tank 220 and pressurize the stream of liquid hydrogen to form an intermediate pressurized liquid hydrogen stream 223 at a pressure greater than about 2.4 bar(a). The intermediate pressurized liquid hydrogen stream 223 is the warmed in the heat exchanger 225 via indirect heat exchange against a recycled gaseous hydrogen stream or saturated vapor stream 233 from the target tank 230 to form a warmed intermediate pressurized liquid hydrogen stream 226 at a temperature between about 26 Kelvin and 30 Kelvin. The warmed intermediate pressurized liquid hydrogen stream 226 is then further pressurized via a second cryogenic pump 124 to form a warmed fully pressurized liquid hydrogen stream 229 at a pressure equal to or greater than about 4.0 bar(a), and more preferably to a pressure range of about 4.0 bar(a) and 10.0 bar(a). The warmed, fully pressurized liquid hydrogen stream is then fed to the target tank 230.

A vapor stream 246 from recovery tank 245 is directed to heat exchanger 225 to assist in cooling the saturated vapor hydrogen stream from a headspace or overhead of the target tank 130 while a portion of the liquid hydrogen 248 from the recovery tank 245 is recycled and combined with the liquid hydrogen in the holding tank 220. Similar to the embodiment shown and described with reference to FIG. 3, the warmed vapor stream 247 is then vented to the atmosphere.

While the present system and method have been described with reference to a preferred embodiment or embodiments, it is understood that numerous additions, changes, and omissions can be made without departing from the spirit and scope of the present invention as set forth in the appended claims. For example, the above-described embodiments are preferably directed to a liquid hydrogen filling system and process, but many of the innovative techniques disclosed herein are equally suitable for use in high rate tank filling for other cryogenic fluids.

Thus, from a definition standpoint the term or phrase 'cryogenic liquid' is being defined to mean a liquid possessing a boiling point less than −150 °C and may include liquid air, liquid oxygen, liquid argon, liquid nitrogen, liquid helium, liquid neon, liquid xenon, liquid krypton, in addition to liquid hydrogen.

What is claimed is:

1. A liquid cryogen filling system, comprising:
- a holding tank configured to store a liquid cryogen;
- two or more cryogenic pumps disposed in series arrangement downstream of the holding tank, the two or more cryogenic pumps configured to pressurize a stream of the liquid cryogen from the holding tank to form a pressurized liquid cryogen stream;
- a heat exchanger configured to warm the pressurized liquid cryogen stream via indirect heat exchange against a recycled gaseous cryogen stream to yield a liquid cryogen recycle stream and a warmed, pressurized liquid cryogen stream;
- a target tank disposed downstream of the heat exchanger and configured to receive the warmed, pressurized liquid cryogen stream;
- a recycle circuit comprising a first conduit configured to direct a saturated vapor cryogen stream from a headspace or overhead of the target tank to the heat exchanger as the recycled gaseous cryogen stream and a second conduit configured to receive the liquid cryogen recycle stream from the heat exchanger;
- one or more valves disposed in the recycle circuit downstream of the heat exchanger; and
- a recovery tank disposed downstream of the one or more valves and configured to receive the liquid cryogen recycle stream;
- wherein a liquid cryogen stream from the recovery tank is recycled.

2. The liquid cryogen filling system of claim 1, wherein the liquid cryogen is liquid hydrogen.

3. The liquid cryogen filling system of claim 1, wherein the one or more valves further comprise an expansion valve configured to expand the liquid cryogen recycle stream to form a dual phase cryogen recycle stream and the dual phase cryogen recycle stream is directed to the recovery tank.

4. The liquid cryogen filling system of claim 1, wherein the one or more valves further comprise a pressure control valve configured to control the pressure in the recycle circuit and wherein the liquid cryogen recycle stream is directed to the recovery tank where it expands to form a dual phase cryogen recycle stream.

5. The liquid cryogen filling system of claim 1, wherein the liquid cryogen stream from the recovery tank is recycled and combined with the liquid cryogen from the holding tank at a location between the two or more cryogenic pumps.

6. The liquid cryogen filling system of claim 5, wherein a gaseous cryogen from the recovery tank is vented.

7. The liquid cryogen filling system of claim 1, wherein the liquid cryogen stream from the recovery tank is recycled and combined with the liquid cryogen in the holding tank.

8. The liquid cryogen filling system of claim 7, wherein a gaseous cryogen from the recovery tank is vented.

9. The liquid cryogen filling system of claim 7, wherein a gaseous cryogen from the recovery tank is directed to the heat exchanger to cool the recycled gaseous cryogen stream and a resulting warmed gaseous cryogen is vented.

10. The liquid cryogen filling system of claim 1, wherein the liquid cryogen is liquid hydrogen and wherein the heat exchanger is disposed downstream of the two or more cryogenic pumps and configured to warm a pressurized liquid hydrogen stream to a temperature between 26 Kelvin and 30 Kelvin via indirect heat exchange against a recycled gaseous hydrogen stream to yield a warmed, pressurized liquid hydrogen stream and a liquid hydrogen recycle stream.

11. The liquid cryogen filling system of claim 1, wherein the liquid cryogen is liquid hydrogen and wherein the heat exchanger is interposed between the two or more cryogenic pumps and configured to warm a partially pressurized liquid hydrogen stream to a temperature between 26 Kelvin and 30 Kelvin via indirect heat exchange against a recycled gaseous hydrogen stream to yield a warmed, partially pressurized liquid hydrogen stream and a liquid hydrogen recycle stream, and wherein the warmed partially pressurized liquid hydrogen stream is further pressurized in the cryogenic pumps to yield a pressurized liquid hydrogen stream.

12. The liquid cryogen filling system of claim 1, wherein a flow rate of the liquid cryogen through the two or more cryogenic pumps is equal to or greater than 100 kg/min of liquid cryogen.

13. The liquid cryogen filling system of claim 1, wherein a pressure of the holding tank is in the range of 1.2 bar(a) and 2.4 bar(a) and a pressure of the target tank is in the range of 4.0 bar(a) and 10.0 bar(a).

14. The liquid cryogen filling system of claim 1, wherein the liquid cryogen is liquid hydrogen and wherein a temperature of the liquid hydrogen in the holding tank is equal to or lower than 23 Kelvin and a temperature of a warmed, pressurized liquid hydrogen stream is equal to or greater than 26 Kelvin.

15. The liquid cryogen filling system of claim 1, wherein the liquid cryogen is liquid hydrogen and wherein the heat exchanger further comprises a liquid nitrogen shield configured to maintain the heat exchanger at or near cryogenic temperatures to facilitate start-up of the liquid cryogen filling system.

16. A method of filling a tank with a liquid cryogen comprising the steps of:

pressurizing a liquid cryogen from a holding tank to form a pressurized liquid cryogen stream;

warming the pressurized liquid cryogen stream via indirect heat exchange against a recycled gaseous cryogen stream to yield a liquid cryogen recycle stream and a warmed, pressurized liquid cryogen stream;

filling a target tank with the warmed, pressurized liquid cryogen stream;

taking a saturated vapor cryogen stream from a headspace or overhead of the target tank as the recycled gaseous cryogen stream;

expanding the liquid cryogen recycle stream to form a dual phase cryogen recycle stream within a recovery tank or directed to the recovery tank; and recycling the cryogen liquid from the recovery tank to either the holding tank or to the pressurized liquid cryogen stream.

17. The method of claim 16, wherein the liquid cryogen is liquid hydrogen.

18. The method of claim 16, wherein the step of expanding the liquid cryogen recycle stream further comprises expanding the liquid cryogen recycle stream in an expansion valve disposed upstream of the recovery tank to form a dual phase cryogen recycle stream and the dual phase cryogen recycle stream is directed to the recovery tank.

19. The method of claim 16, wherein the step of expanding the liquid cryogen recycle stream further comprises releasing the liquid cryogen recycle stream directly into the recovery tank where it expands to form a dual phase cryogen recycle stream.

20. The method of claim 16, wherein the step of pressurizing the liquid cryogen from a holding tank to form a pressurized liquid cryogen stream further comprises pressurizing the liquid cryogen from a holding tank in a first cryogenic pump to form an intermediate pressurized liquid cryogen stream and further pressurizing the intermediate pressurized stream to a fully pressurized liquid cryogen stream in a second cryogenic pump.

21. The method of claim 20, wherein the step of recycling the liquid cryogen stream from the recovery tank further comprises combining the liquid cryogen stream from the recovery tank with the intermediate pressurized liquid cryogen stream.

22. The method of claim 16, wherein a cryogen vapor from the recovery tank is vented.

23. The method of claim 16, further comprising the steps of: directing a cryogen vapor from the recovery tank to a heat exchanger; and cooling the liquid cryogen recycle stream via indirect heat exchange with the cryogen vapor.

24. The method of claim 16, wherein a pressure of the liquid cryogen in the holding tank is in the range of 1.2 bar(a) and 2.4 bar(a) and a pressure of the warmed, pressurized liquid cryogen in the target tank is in the range of 4.0 bar(a) and 10.0 bar(a).

25. The method of claim 16, wherein the liquid cryogen is liquid hydrogen and wherein a temperature of the liquid hydrogen in the holding tank is equal to or lower than 23 Kelvin and a temperature of a warmed, pressurized liquid hydrogen stream is equal to or greater than 26 Kelvin.

* * * * *